US011970899B2

(12) United States Patent
Hall et al.

(10) Patent No.: US 11,970,899 B2
(45) Date of Patent: *Apr. 30, 2024

(54) OVERHEAD DOOR OPENER SYSTEM WITH ONE WAY BEARING

(71) Applicant: Hall Labs LLC, Provo, UT (US)

(72) Inventors: David R. Hall, Provo, UT (US); Jerome Miles, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,069

(22) Filed: Jun. 28, 2021

(65) Prior Publication Data

US 2021/0404239 A1 Dec. 30, 2021

Related U.S. Application Data

(60) Provisional application No. 63/045,083, filed on Jun. 27, 2020.

(51) Int. Cl.

*E05F 15/00* (2015.01)
*E05F 15/684* (2015.01)
*E05F 15/73* (2015.01)

(52) U.S. Cl.

CPC ............ *E05F 15/684* (2015.01); *E05F 15/73* (2015.01); *E05Y 2201/216* (2013.01); *E05Y 2201/434* (2013.01); *E05Y 2201/652* (2013.01); *E05Y 2201/656* (2013.01); *E05Y 2201/668* (2013.01); *E05Y 2400/32* (2013.01); *E05Y 2400/36* (2013.01); *E05Y 2400/40* (2013.01); *E05Y 2400/44* (2013.01); *E05Y 2400/54* (2013.01); *E05Y 2900/106* (2013.01)

(58) Field of Classification Search

CPC ....... E05F 15/668; E05F 15/684; E05F 15/73; E05Y 2201/216; E05Y 2201/434; E05Y 2201/652; E05Y 2201/668; E05Y 2400/32; E05Y 2400/36; E05Y 2400/40; E05Y 2400/44; E05Y 2400/54; E05Y 2900/106; E05Y 2201/684

See application file for complete search history.

(56) References Cited

U.S. PATENT DOCUMENTS 5,010,688 A * 4/1991 Dombrowski ........ E05F 15/681 49/362
6,051,947 A * 4/2000 Lhotak .................. E05F 15/684 318/265
6,474,784 B1 * 11/2002 Fujii .................... B41J 2/14314 347/54

(Continued)

*Primary Examiner* — Chi Q Nguyen

(57) ABSTRACT

A mechanism for opening and closing an overhead door includes a drive loop coupled to the overhead door, a motor with a drive shaft and a drive wheel for driving the drive loop. A one-way bearing couples the drive shaft to the drive wheel, which one-way bearing is configured to transmit torque from the motor to the drive wheel, as the motor rotates the drive shaft in a first rotational direction to raise the overhead door, and configured so that torque is not transmitted to the drive wheel as the motor rotates the drive shaft in a second rotational direction opposite the first rotational direction. As a result, the motor applies torque through the one-way bearing to raise the overhead door and to support the weight of the overhead door while lowering the overhead door.

20 Claims, 4 Drawing Sheets

(56) References Cited

U.S. PATENT DOCUMENTS

| | | | | |
|---|---|---|---|---|
| 7,061,197 | B1 * | 6/2006 | Mullet | E05F 15/41 318/471 |
| 7,114,291 | B2 * | 10/2006 | David | E06B 9/84 49/197 |
| 8,069,896 | B2 * | 12/2011 | Magro | E06B 9/74 160/1 |
| 8,651,164 | B2 * | 2/2014 | Klish | A62C 2/247 160/1 |
| 8,689,486 | B2 * | 4/2014 | Menning | E05F 15/668 160/188 |
| 8,893,764 | B2 * | 11/2014 | Mascari | E05F 5/003 16/82 |
| 11,441,347 | B2 * | 9/2022 | Hall | E05F 15/686 |
| 2003/0062865 | A1 * | 4/2003 | Mullet | E05F 15/668 318/445 |
| 2008/0047672 | A1 * | 2/2008 | Gorman | E05F 15/684 160/1 |
| 2014/0250787 | A1 * | 9/2014 | Olmsted | E05F 15/70 49/31 |

* cited by examiner

OVERHEAD DOOR OPENER SYSTEM WITH ONE WAY BEARING

CROSS-REFERENCE TO RELATED APPLICATIONS

This application claims priority to U.S. Provisional Patent Application No. 63/045,083 entitled "OVERHEAD DOOR OPENER SYSTEM WITH ONE WAY BEARING" filed Jun. 27, 2021.

TECHNICAL FIELD

The present disclosure is directed to apparatuses, systems, and methods for raising and lowering an overhead door.

BACKGROUND

This invention relates to systems and methods for raising and lowering an overhead door such as a garage door, commercial door, roller door, or loading doors. Conventional methods for opening and closing overhead doors include some form of stopping mechanism. Many employ optical sensors near the ground to stop the garage if an impediment enters the field of vision of the sensors, or torque limiters and force-feedback mechanisms. These stopping mechanisms have practical limits and may rely on assumptions. For example, optical sensors near the ground may have a limited field of view and, thus, may not stop the downward force on the overhead door from the door opener, if an impediment is not in the field of view. There is a need in the art for an improved, reliable, and safe mechanism to raise and lower overhead doors.

SUMMARY

Embodiments of the present disclosure are directed to a mechanism for opening and closing an overhead door. The mechanism includes a drive loop coupled to the overhead door and a motor with a drive shaft. The mechanism also includes a drive wheel for driving the drive loop and a one-way bearing coupling the drive shaft to the drive wheel. The one-way bearing is configured to transmit torque from the motor to the drive wheel, as the motor rotates the drive shaft in a first rotational direction to raise the overhead door. The one-way bearing is configured so that torque is not transmitted to the drive wheel as the motor rotates the drive shaft in a second rotational direction opposite the first rotational direction. The motor thereby applies torque through the one-way bearing to raise the overhead door and to support the weight of the overhead door while lowering the overhead door.

Further embodiments of the present disclosure are directed to an overhead door including a drive loop with a bracket releasably coupled to the drive loop, a door coupled to the bracket, a motor, and a one-way bearing. The one-way bearing includes a first component coupled to the motor and a second component coupled to the drive loop. The first and second components do not rotate relative to one another in a first rotational direction to allow the motor to apply torque to the drive loop. The first and second components rotate relative to one another when torque is applied from the drive loop to the motor.

Still further embodiments of the present disclosure are directed to an overhead door opener including a motor, a drive loop, and a door coupled to the drive loop. The overhead door opener also includes a first transmission component coupled to the motor, a second transmission component coupled to the door, the first and second transmission components comprising a one-way bearing to transmit torque from the motor to the drive loop. The first and second transmission components allow rotation of the first component relative to the second transmission component if torque is applied from the drive loop to the motor. The motor is configured to raise and lower the door by applying power to the drive loop. The overhead door opener also includes a first monitor coupled to the first transmission component and configured to observe rotation of the first transmission component, and a second monitor coupled to the second transmission component and configured to observe rotation of the second transmission component. A comparison between the rotation of the first and second transmission components is used to stop the motor if the comparison deviates from an expected value by more than a predetermined threshold amount.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

A one-way bearing is any device that is capable of transmitting torque when rotated in one direction but does not transmit torque when rotated in the opposite direction. Many one-way bearings have two pieces that rotate relative to one another when rotated in the direction in which torque is not transmitted, and that do not rotate relative to one another and thereby transmit torque when rotated in the opposite direction. Some examples of a one-way bearing are one-way clutch bearings or Sprag style bearings, also known as a sprag clutch that are constructed from a drawn cup with needle roller clutches and have a small radial section height. They are often called one-way bearings, anti-reverse bearings, and clutch bearings. For purposes of explanation and brevity, reference throughout this document is made to one-way bearings without loss of generality. Preferably, the units are compact, lightweight and operate directly on a shaft; they are also suitable for transmitting high torque.

Figure 1:
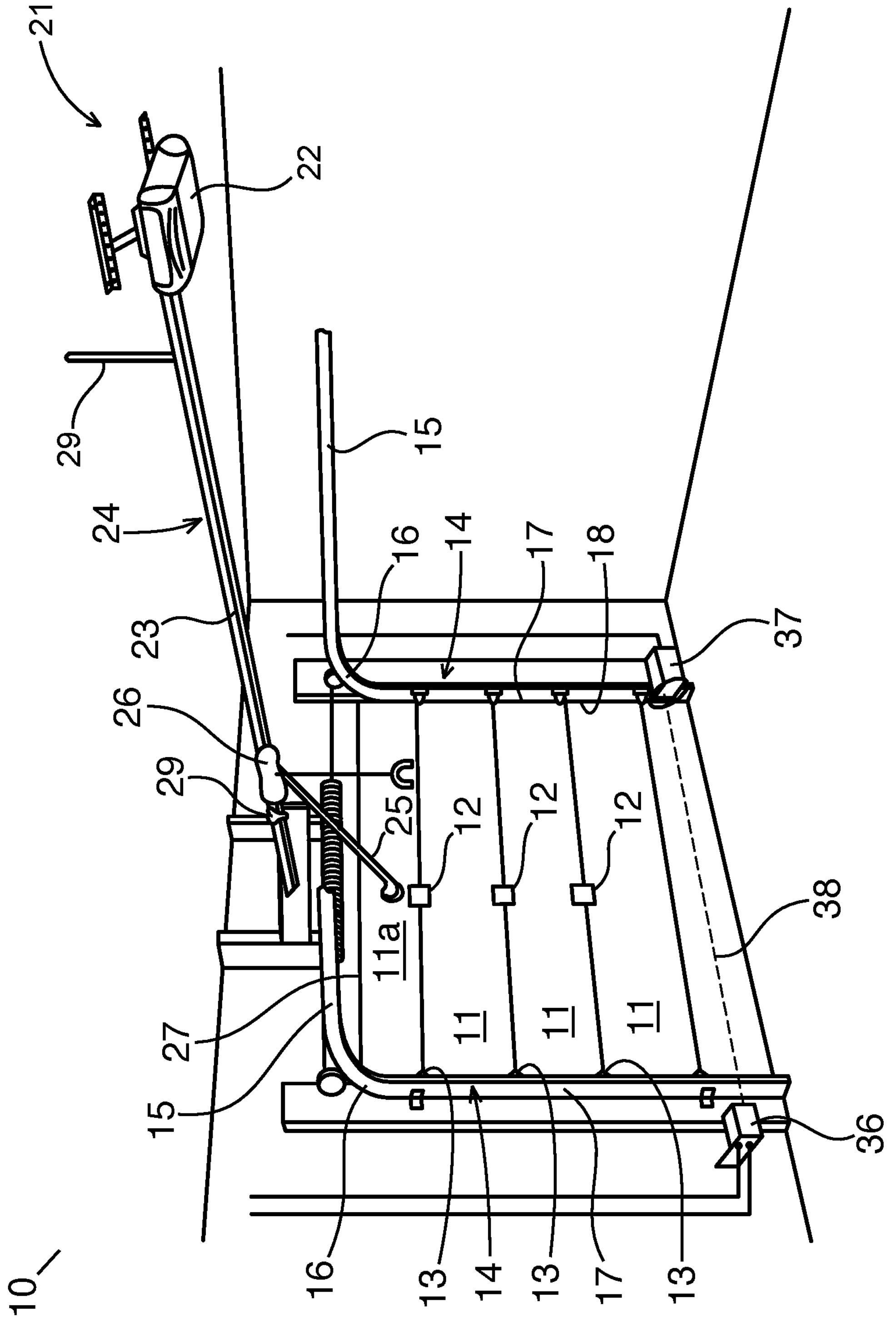
FIG. 1 is a perspective view looking up at an overhead door system according to an embodiment of the present disclosure.

As see in FIG. 1, the typical overhead garage door 10 consists of a plurality of door panel segments 11 and 11*a* which are joined together by horizontally spaced hinges 12, 12, each horizontal panel segment having one or more pairs of vertically spaced sets of rollers 13, 13 that are guided in a pair of generally parallel tracks 14, 14; which tracks include a generally horizontal portion 15 and a generally vertical portion 17 at right angles to the vertical portion and joined by a curved intermediate portion 16 mounted in the opening 18 for entry of a vehicle into and from the garage.

Figure 2:
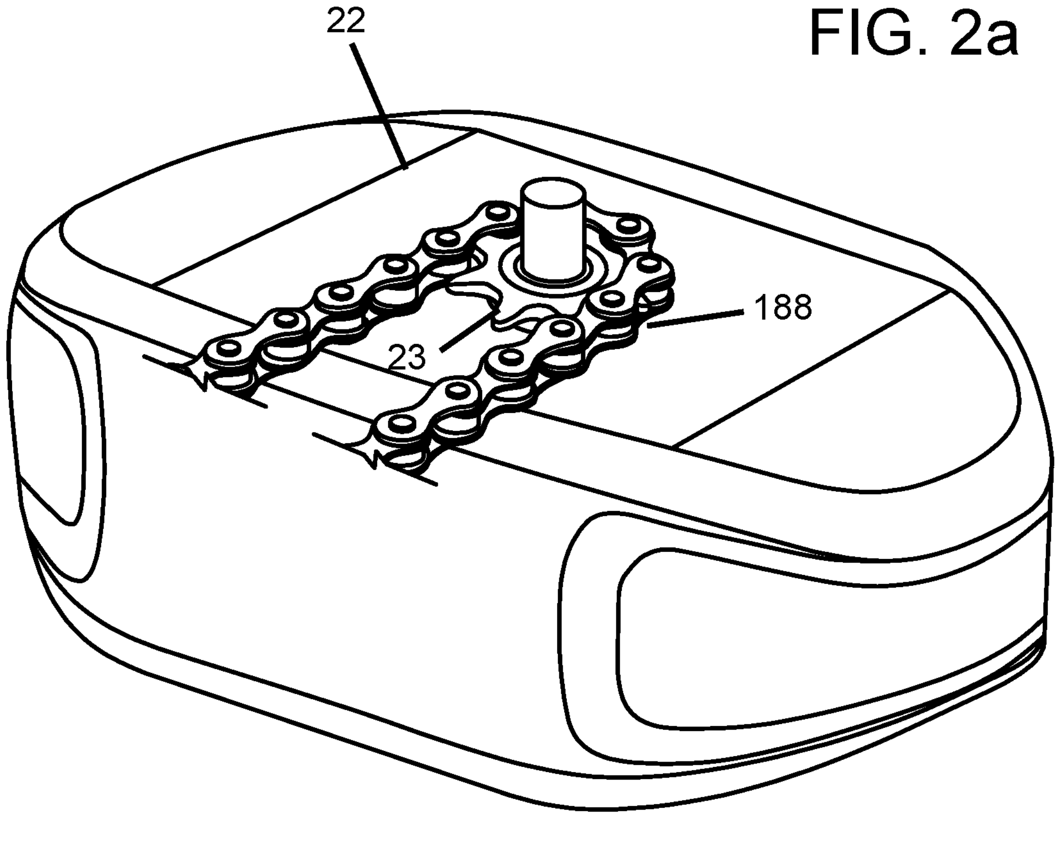
FIG. 2 is a perspective view from the motor, sprocket and chain unit of the embodiment shown in FIG. 1.
Figure 3:
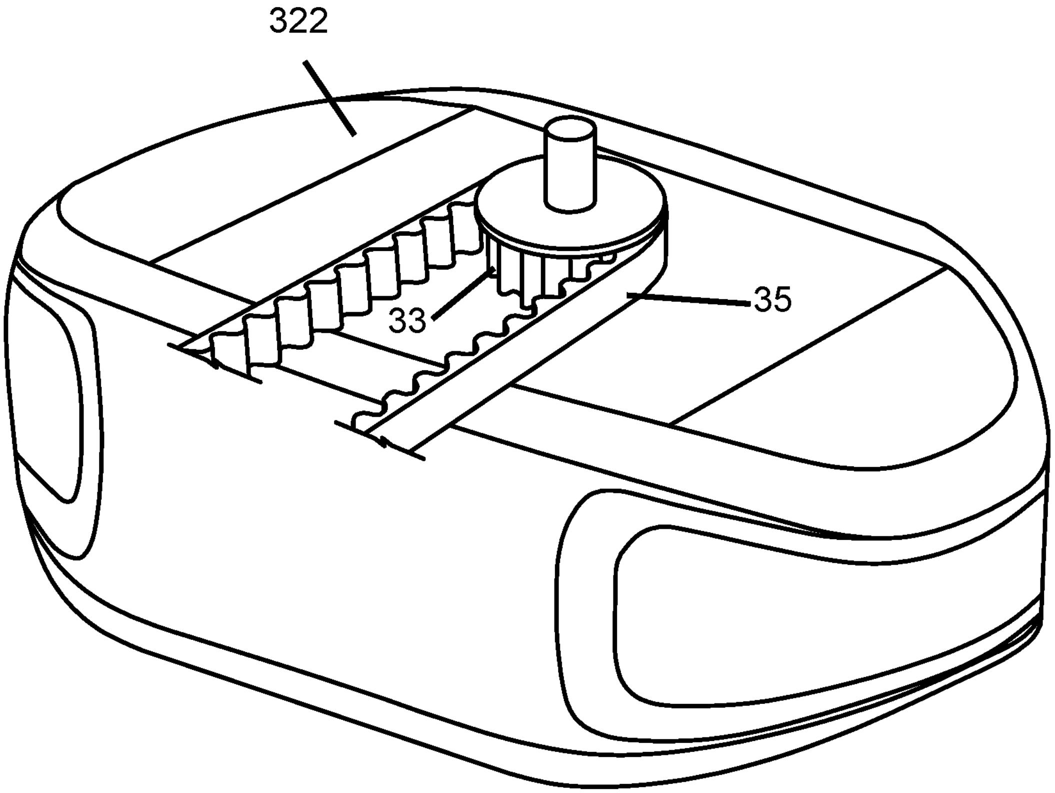
FIG. 3 is a view similar to FIG. 2 of an embodiment having a drive pulley and belt.
Figure 4:
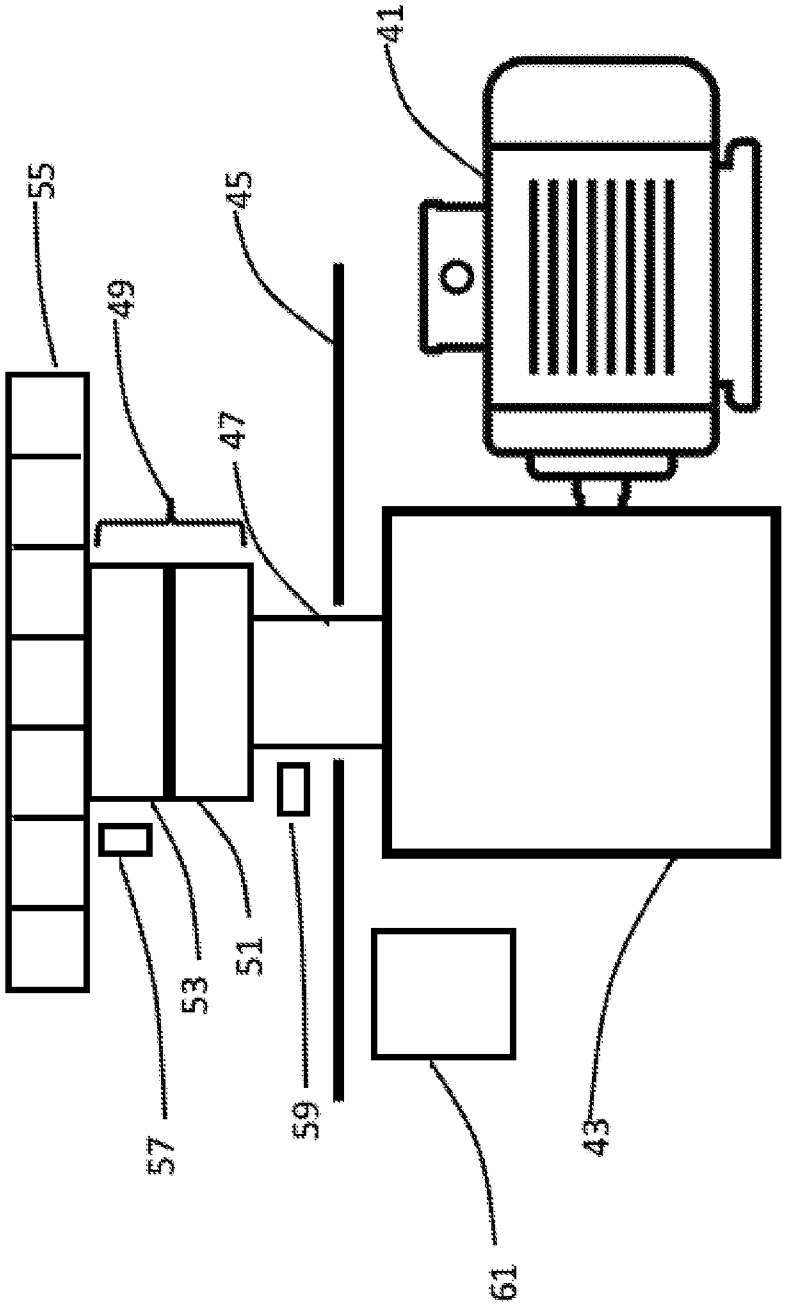
FIG. 4 is a schematic side view of the drive shaft, one-way bearing and drive wheel.

A garage door opening mechanism 21 consists of a reversible electric motor in a case 22 which drives a drive shaft (see 47 in FIG. 4). The drive shaft is coupled to a drive wheel, which is either a sprocket 23 as shown in FIG. 2, or a drive pulley (see 33 in FIG. 3). Drive wheels, drive pulleys, and other rotating mechanical elements are generally referred to as "drive loops" having a rotating input (a drive wheel) such as a gear that is driven by a motor, and a loop such as a chain, a belt, or the equivalent (a drive loop). As shown in FIGS. 1 and 2, the drive loop is a chain 188, configured to travel in a loop above the garage door. A bracket 25 is secured to the upper edge 27 of the upper panel segment 11 *a* of the garage door 10 and connected to the drive loop 24 by a follower 26. In some embodiments the follower 26 and bracket 25 are collectively referred to as a bracket 25. In other embodiments the central track can instead be two parallel tracks on either side of the door 10.

In alternative embodiments, the drive loop is a belt, as shown as 35 in FIG. 3, or any other suitable power transmission means. When a belt is used, it is preferably a toothed belt, used with a toothed drive pulley 33.

As is conventional, the overhead drive loop is provided with a pair of limit switches 28, 29, respectively, that are positioned adjacent the ends of the central drive loop 24 and are adapted to be engaged either by a portion of the garage door panel segment 11 or a portion of the closer unit bracket 25 to de-energize the electric motor 22 at either end of garage door travel.

In yet other embodiments, the garage door is a single panel of a size to close the opening 18 of the garage, but without articulation; the door taking a different path of movement for opening and closing when actuated by the closer unit.

In the embodiment shown in FIGS. 1 and 2, the system uses a chain 188 as the drive loop to move the door 10.

FIG. 2 is a top view of the motor unit 22 shown in FIG. 1. As can be seen, the drive wheel is a sprocket 23, which sits above the housing of the unit and which engages a chain 188.

Figure 2A:
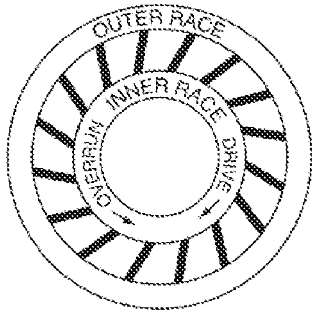
FIG. 2*a* is a schematic view of a one-way bearing, also known as a sprag clutch.

FIG. 2*a* is a schematic view of a sprag clutch, which is one one-way bearing useful in the present invention.

FIG. 3 is a view similar to FIG. 2, except that the drive wheel is a toothed drive pulley 33, which engages a toothed belt 35.

As seen in FIG. 4, the electric motor 41 in the unit is rotationally coupled to the drive shaft 47 via the transmission 43. The drive shaft 47 passes through the upper wall 45 of the unit. The shaft 47 is coupled to the drive wheel 55 through a one-way bearing 49. The one-way bearing consists of a first component 51 fixedly attached to the drive shaft and a second component 53 fixedly attached to the drive wheel 55.

The interface between the first and second component of the one-way bearing is configured so that torque is transferred through it in first rotational direction, i.e. while raising the door, while torque is not be transferred through it in the opposite rotational direction, i.e. to force the door downward. As such, the motor applies torque to the drive wheel when the garage door is lifted. Nevertheless, since torque is not transferred through the one-way bearing in the opposite rotational direction, the motor cannot apply torque to the drive wheel and push the overhead door down.

This configuration results in a safer system, namely one that it does not exert a downward force on the door through the drive loop. Rather, the one-way bearing is engaged only to support the weight of the door as the drive loop is moved to lower the door. When the door hits any impediment to downward movement, such as by a child standing under the overhead door, the torque against the one-way bearing is released and the door can stop its downward motion, without any downward force applied by the motor.

It is an advantage that this safety feature is mechanical and passive—no electronics are required and as such the safety mechanism provided by the one-way bearing is not subject to a functioning electronics system, a sensor, any logic or any other input. The response time of the safety feature is instantaneous and is not subject to any network latency or any communication protocol between electronic components.

The one-way bearing, such as that shown as 49 in FIG. 4 and schematically in FIG. 2*a*, is designed to transmit torque when the motor turns in a first direction that causes the overhead door to raise. The one-way bearing also transmits torque in the first direction when the motor is operated in reverse to lower the overhead door. The weight of the door on the bearing creates the torque in the first direction as the door is raised and lowered. The "first direction" is an angular direction when referring to the torque applied by the one-way bearing. Movement in a second direction opposite the first direction, however, causes the one-way bearing to rotate freely. The one-way bearing can be made of two separate parts, one coupled to the output shaft and one coupled to the sprocket. These parts are not allowed to rotate relative to one another in the first direction but are allowed to rotate relative to one another in the second direction. Accordingly, the motor cannot transmit torque in the second direction to the overhead door. The motor can transmit torque to the shaft, but the shaft cannot transmit torque to the motor 120. Of course, no bearing is completely devoid of torque. There may be some resistance and friction, but the overall effect is as close to zero transmitted torque as is practically possible. When the overhead door is lowered and contacts an impediment that stops downward movement of the overhead door, it will cause a torque to be applied through the door and into the shaft. The one-way bearing will not transmit this torque and will also therefore prevent the motor from exerting a downward force on the door. The only downward force then is the weight of the door itself, which can be balanced by a spring. The one-way bearing is therefore a safety mechanism that does not require any power to operate.

When the door is in a fully or mostly retracted position, most of the weight of the door is supported by components such as upper rails above the shaft and therefore the weight is not acting on the shaft. If there is insufficient weight on the shaft to cause the shaft to rotate and lower the door, the motor needs to apply downward torque to the shaft. However, the one-way bearing prevents such torque in part to prevent downward torque from causing an injury. To address this, an electro-mechanical clutch may be coupled to the one-way bearing. The electro-mechanical clutch, when activated, fixes the one-way bearing effectively converting the one-way bearing into a rigid coupling fastened to the shaft that is capable of transmitting torque in both directions. When the electro-mechanical clutch is not activated, the one-way bearing operates as a one-way bearing.

In an alternative embodiment, the initial downward motion of the door is facilitated by a spring assist system, such as that shown in co-pending U.S. application Ser. No. 17/355,112, entitled "Spring Assisted Overhead Door." The entire disclosure of this co-pending application is incorporated herein.

In some embodiments the motor can include a lock that can unlock the overhead door in response to a signal. The motor can receive different signals from remote or hard-wired controllers. The signals can cause the motor to raise, lower, or stop the door. Or the signals can actuate lights or sensors or other accessories. In some embodiments the signals cause two or more objects to take action. The signals can be the same signal to open the door, or it can be different from, but tied to the signal to open the door.

The electro-mechanical clutch can be configured to operate for a first distance of travel of the door. For example, the first two feet of movement is in some embodiments sufficient distance for the weight of the door to provide the downward force to close the door. In other embodiments a tension monitor can be used to monitor the tension on the electro-mechanical clutch and if the tension reaches a certain level it will release the one-way bearing. The electro-mechanical clutch can be operated with power from a power supply (not shown) to the motor or from the motor or from another outlet in the garage. The electro-mechanical clutch 125 can be configured to fail open, meaning that in the event of power loss the electro-mechanical clutch does not grasp the one-way bearing, permitting the door to be opened manually, and not to exert a downward force onto the door.

As a result, any blockage of the downward movement of the door will cause the one-way bearing to spin. The spools will immediately stop spinning, and even though the motor may continue to rotate, the spools will not continue to rotate and create slack in the cables. Also, the downward force of the door is limited to the weight of the door. In some embodiments, this weight is counterbalanced by a torsion spring on the shaft to further reduce the weight of the door as it moves upward and downward. The torsion spring is connected at one end to the shaft and at the other end to a stationary piece on the structure. The overhead door of the present disclosure is therefore safer and less prone to errors than conventional designs that require sensors and other electronic mechanisms such as force limiters and other similar devices to stop a downward force from causing damage to the source of the perhaps delicate item or person blocking the door. The stoppage of the downward force of the door is not subject to an electronic system working properly. The one-way bearing requires no electronics, no communication, and no software to prevent a dangerous situation from harming someone who finds themselves under the door as it comes down.

While the embodiment schematically depicted in FIG. 4 shows the one-way bearing 49 at the top of the shaft 47 and just below the drive wheel 55, it should be appreciated that it can be placed anywhere in the drive train, so long as the motor is able to transmit torque to the drive wheel to open the overhead door, but not transmit torque to push the overhead door to the close position. For example, the one-way bearing may be incorporated into the transmission.

Referring again to FIG. 4, the system of the invention also preferably includes a first device operably coupled to the drive shaft, such as the encoder 59. to observe the angular velocity of the drive shaft 47. Alternatively, the first device can be set to observe the angular velocity of the motor, some gear in the transmission 43, or any other rotating component on the same side of the drive train as the first component of the one-way bearing.

The system also includes a second device 57 configured to observe the angular velocity of a component on the other side of the one-way bearing, that is on the same side as the drive wheel. Preferably, the second device 57 observes the angular velocity of the drive wheel 55. Any component downstream from the one-way bearing can be monitored by the second device.

In an alternative embodiment, the first and second device are built into the two components of the one-way bearing.

Preferably, the devices 57 and 59 are magnetic encoders. Alternatively, the devices are optical encoders, or any other device that can observe angular velocity. An encoder is an electro-mechanical device that converts the angular position or motion of a shaft or axle to analog or digital output signals. There are two main types of rotary encoder: absolute and incremental. The output of an absolute encoder indicates the current shaft position, making it an angle transducer. The output of an incremental encoder provides information about the motion of the shaft, which typically is processed elsewhere into information such as position, speed, and distance. Rotary encoders are used in a wide range of applications that require monitoring or control, or both, of mechanical systems, including industrial controls, robotics, photographic lenses, computer input devices such as optomechanical mice and trackballs, controlled stress rheometers, and rotating radar platforms.

The first and second devices operate together to detect slippage of the one-way bearing. When the torque is applied in the first direction, the two components of the one-way bearing will not rotate relative to one another, but when the overhead door is stopped from moving downward, the two components of the one-way bearing rotate with respect to each other and this relative rotation difference will be measurable by the devices.

Preferably, the devices communicate with a controller 61. The controller 61 is configured to issue any of a series of commands in response to such rotational deviancy. The commands can include at least one of a command to stop the motor, a command to raise the overhead door; a command to sound an alarm; and a command to send a notification to a remote device, such as a smart phone or home automation or security system.

The devices 57 and 59 and controller 61 are shown schematically. It is to be appreciated by a person of ordinary skill in the art that these components can be built into the motor, they can be wired, wireless and/or remote, they can be attached to the shafts and components of the motor.

In some embodiments the shaft 190 is oriented with its axle of rotation being transverse to the drive loop 24. There may be other transmission components between the motor unit 22 and the drive loop 24. In some embodiments the drive loop 22 not actually a loop, instead it can be a single linear chain, belt, or track.

Many overhead openers feature release systems by which the motor cane be uncoupled from the door so that manual operation of the door is possible without moving the motor in case of loss of power or if the motor is inoperable for some reason. In some embodiments the release mechanism for the system is a latch that uncouples the one-way bearing. A leash may be attached to the one-way bearing that is pulled to release the one-way bearing.

Because the overhead door is not forced down by the motor, it is preferably to include a lock to lock the overhead door in the closed position, such as a conventional deadbolt lock typically used for side-mount installations. This lock is preferably configured to unlock the overhead door in response to a signal, which signal is the same as a signal to open the door or is different from but tied to the signal to open the door. For example, a signal may originate with the door opener, which is then relayed to the lock. Alternatively, the signal may originate at the lock and then be relayed to the opener. Still alternatively, a single signal may be sent to both the lock at the opener at the same time.

A structure similar in some respects is disclosed in U.S. patent application Ser. No. 16/805,771 entitled MECHANISM FOR OPENING AND CLOSING AN OVERHEAD DOOR INCLUDING ONE WAY BEARING filed on Feb. 29, 2020 which is incorporated herein by reference in its entirety.

All patents and patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A mechanism for opening and closing an overhead door, comprising:
- a drive loop;
- a motor with a drive shaft;
- a drive wheel for driving the drive loop; and
- a one-way bearing coupling the drive shaft to the drive wheel, wherein the one-way bearing is configured to transmit torque from the motor to the drive wheel, as the motor rotates the drive shaft in a first rotational direction to raise the overhead door, and wherein the one-way bearing is configured so that torque is not transmitted to the drive wheel as the motor rotates the drive shaft in a second rotational direction opposite the first rotational direction;
- whereby the motor applies torque through the one-way bearing to raise the overhead door and to support the weight of the overhead door while lowering the overhead door.

2. The mechanism of claim 1 wherein the drive loop is a chain and the drive wheel is a sprocket.

3. The mechanism of claim 1 wherein the drive loop is a belt and the drive wheel is a pulley.

4. The mechanism of claim 1 wherein the one-way bearing comprises a first component and a second component that rotate relative to one another such that torque is applied from the drive loop to the motor, thereby preventing torque from being transmitted from the drive loop to the motor, and wherein the first component and second component do not rotate relative to one another when torque is applied by the motor to the drive loop, thereby allowing torque to be transmitted from the motor to the drive loop.

5. The mechanism of claim 1, further comprising a device to detect relative rotation between the drive shaft and the drive wheel.

6. The mechanism of claim 5 wherein the device comprises a first encoder measuring rotation of the drive shaft and a second encoder measuring rotation of the drive wheel.

7. The mechanism of claim 5, further comprising a controller configured to issue a command to the motor in response to the device detecting rotation between the drive shaft and the drive wheel, wherein the command comprises at least one of:
- a command to stop the motor;
- a command to raise the overhead door;
- a command to send an alarm; and
- a command to send a notification to a remote device.

8. The mechanism of claim 1, further comprising a lock to lock the overhead door in a closed position.

9. The mechanism of claim 1, wherein the lock is configured to unlock the overhead door in response to a signal, wherein the signal is the same as an instruction to open the door.

10. The mechanism of claim 1, further comprising an electro-mechanical clutch applied to the one-way bearing, the electro-mechanical clutch being configured to lock the one-way bearing and thereby render the one-way bearing capable of transmitting torque in both rotational directions, wherein the electro-mechanical clutch is operative until the weight of the door is sufficient to continue downward motion without torque from the motor.

11. The mechanism of claim 10, further comprising a tension monitor coupled to the electro-mechanical clutch, wherein the tension monitor is configured to measure tension on the clutch by the weight of the door, and when the tension is sufficiently high that the electro-mechanical clutch is not needed the electro-mechanical clutch releases the one-way bearing.

12. An overhead door, comprising:
- a drive loop with a bracket releasably coupled to the drive loop;
- a door coupled to the bracket;
- a motor; and
- a one-way bearing comprising a first component coupled to the motor and a second component coupled to the drive loop, wherein the first and second components do not rotate relative to one another in a first rotational direction to allow the motor to apply torque to the drive loop, and wherein the first and second components rotate relative to one another when torque is applied from the drive loop to the motor.

13. The overhead door of claim 12 wherein the drive loop comprises a belt or a chain.

14. The overhead door of claim 12, further comprising a drive shaft and a drive wheel, wherein the drive shaft is the first component and the drive wheel is the second component.

15. The overhead door of claim 12 wherein the overhead track comprises two parallel overhead tracks.

16. An overhead door opener, comprising:

a motor;

a drive loop;

a door coupled to the drive loop;

a first transmission component coupled to the motor;

a second transmission component coupled to the door, the first and second transmission components comprising a one-way bearing to transmit torque from the motor to the drive loop, wherein torque applied from the drive loop to the motor causes the first transmission components to rotate relative to the second transmission component, wherein the motor is configured to raise and lower the door by applying power to the drive loop;

a first device coupled to the first transmission component and configured to observe rotation of the first transmission component; and a second device coupled to the second transmission component and configured to observe rotation of the second transmission component, wherein a comparison between the rotation of the first and second transmission components is used to stop the motor in response to observing that the comparison deviates from an expected value by more than a predetermined threshold amount.

17. The overhead door of claim 16 wherein the first device is configured to monitor velocity and not position and wherein the second encoder is configured to monitor velocity and position.

18. The overhead door of claim 16 wherein the transmission components comprise one or more of sprockets, a chain, gears, or a belt.

19. The overhead door of claim 16, further comprising a bracket coupled to the drive loop and the door, the bracket being releasable from the drive loop.

20. The overhead door of claim 16 wherein the drive loop comprises a belt or a chain.

* * * * *